United States Patent [19]

O'Sullivan

[11] Patent Number: 5,297,304
[45] Date of Patent: Mar. 29, 1994

[54] ROLL-UP BODY SUPPORT CUSHION

[76] Inventor: Dennis C. O'Sullivan, 123 Juanita Unit 1-4, Incline Village, Nev. 89451

[21] Appl. No.: 973,084

[22] Filed: Nov. 6, 1992

[51] Int. Cl.⁵ .................................................. A47G 9/00
[52] U.S. Cl. .................................. 5/630; 5/636; 5/922; 5/421; 297/284.5; 297/397
[58] Field of Search .................... 5/630, 632, 636, 448, 5/922, 420, 465, 481, 462, 421; 297/DIG. 6, 284.5, 397; D6/596, 601

[56] References Cited

U.S. PATENT DOCUMENTS

| D. 282,427 | 2/1986 | O'Sullivan | D6/601 |
|---|---|---|---|
| D. 295,936 | 5/1988 | Sanders | D6/601 |
| D. 298,198 | 10/1988 | O'Sullivan | D6/601 |
| 3,143,748 | 8/1964 | Manning | 5/420 |
| 3,243,828 | 4/1966 | McCarty | |
| 3,268,922 | 8/1966 | Moxley | 5/481 |
| 3,279,849 | 10/1966 | Radke et al. | 297/284 |
| 3,308,490 | 3/1967 | Cacioppo | 297/DIG. 6 |
| 3,542,421 | 11/1970 | Ambrose | 297/230 |
| 3,638,251 | 2/1972 | Weiss | 5/490 |
| 3,849,810 | 11/1974 | Degen | |
| 4,210,244 | 7/1980 | Westrick | 312/902 |
| 4,231,125 | 11/1980 | Tittl | 5/419 |
| 4,309,784 | 1/1982 | Cohen | 5/490 |
| 4,413,368 | 11/1983 | Schuetze | 5/494 |
| 4,655,502 | 4/1987 | Houllis | 297/229 |
| 4,666,207 | 5/1987 | Quartano | 297/229 |
| 4,679,848 | 7/1987 | Spierings | 297/284 |
| 4,682,691 | 7/1987 | Spiering | 206/373 |
| 4,688,286 | 8/1987 | Miker, Jr. | 5/490 |
| 4,754,513 | 7/1988 | Rinz | 5/490 |
| 4,783,866 | 11/1988 | Simmons et al. | 5/421 |
| 4,853,994 | 8/1989 | Ekstein | 446/147 |
| 4,862,536 | 9/1989 | Pruit | 5/432 |
| 4,864,668 | 9/1989 | Crisp | 5/490 |
| 4,876,755 | 10/1989 | Parrish | 5/465 |
| 4,941,222 | 7/1990 | Prager | 5/111 |
| 4,945,589 | 8/1990 | Carey | |
| 4,949,411 | 8/1990 | Tesch | 5/464 |
| 5,168,590 | 12/1992 | O'Sullivan | 5/490 |

FOREIGN PATENT DOCUMENTS

| 3138463A1 | 4/1983 | Fed. Rep. of Germany | |
| 1127948 | 12/1956 | France | |
| 16809 | of 1908 | United Kingdom | 5/490 |
| 26072 | of 1909 | United Kingdom | |
| 1837 | of 1912 | United Kingdom | 5/490 |
| 1590583 | 6/1981 | United Kingdom | |

*Primary Examiner*—Alexander Grosz
*Attorney, Agent, or Firm*—Limbach & Limbach

[57] ABSTRACT

A roll-up body support cushion is disclosed. A cushion having first and second opposed surfaces is filled with pillow fill. The cushion has a length and a width and is flexible such that it can be rolled up in a direction substantially parallel to its long sides. At least one strip of a releasable fastening device is secured to the first opposed surface of the cushion. The strip of releasable fastening material is positioned substantially parallel to the length of the cushion. At least one strip of a complementary releasable fastening device is secured to the second opposed surface of the cushion. The strip of complementary releasable fastening device is positioned substantially parallel to the length of the cushion and in juxtaposition to the respective strip of releasable fastening device secured to the first opposed surface.

34 Claims, 6 Drawing Sheets

ROLL-UP BODY SUPPORT CUSHION

BACKGROUND OF THE INVENTION

1. Field of the Invention

The present invention relates to body supports, and more particularly, to a roll-up body support cushion.

2. Description of the Related Art

It is common for people such as travelers, commuters, office workers, truck drivers, and the disabled to be sitting down for long periods of time in automobiles, airplanes, trains, offices, beds and wheelchairs. As is well known, sitting down for long periods of time can cause back and neck fatigue due to lack of support on those portions of the body. Such fatigue in the back is particularly noticeable when support is lacking in the vicinity of the lumbar region of the back.

It has long been recognized that one way to prevent such fatigue is to support the neck and back while the person is seated or lying down. Most chairs, seats, and many beds, however, are inadequately designed to provide the proper support to the fatigue sensitive portions of the body. In order to overcome these inadequacies, conventional support devices such as bolster pillows, cylindrical lumbar supports, semicylindrical lumbar supports, and cervical supports have been used to provide support to a person's body while he or she is seated or lying down. Some of these devices are directed to support of the head, and others are directed to support of the lumbar portion of the back.

Conventional support devices, however, suffer from a number of disadvantages. First, conventional support devices have predetermined shapes, thicknesses, and firmnesses that cannot be adjusted. Because people have many different shapes and sizes, most of the conventional devices cannot be used by everyone. Second, although the predetermined shape, thickness, and firmness of a conventional device may be adequate for a person under some circumstances, it may not be appropriate for that person under all circumstances, such as during more severe or minor cases of fatigue. Third, many conventional support devices cannot accommodate a hot or cold pack. Finally, many conventional support devices have no convenient way of being positioned on a seat or chair.

Thus, there is a need for a body support device that overcomes the disadvantages of conventional support devices.

SUMMARY OF THE INVENTION

The present invention provides a roll-up body support cushion. A cushion having first and second opposed surfaces is filled with pillow fill. The cushion has a length and a width and is flexible such that it can be rolled up in a direction substantially parallel to its length. At least one strip of a releasable fastening device is secured to the first opposed surface of the cushion. The strip of releasable fastening device is positioned substantially parallel to the length of the cushion. At least one strip of a complementary releasable fastening device is secured to the second opposed surface of the cushion. The strip of complementary releasable fastening material is positioned substantially parallel to the length of the cushion and in juxtaposition to the respective strip of releasable fastening device secured to the first opposed surface.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 6(a) illustrates the use of the strap to position the roll-up body support cushion of FIG. 1 on an automobile seat, and FIG. 6(b) illustrates the resulting support given to the lumbar portion of a person's back.

DETAILED DESCRIPTION OF THE PREFERRED EMBODIMENTS

Figure 1:
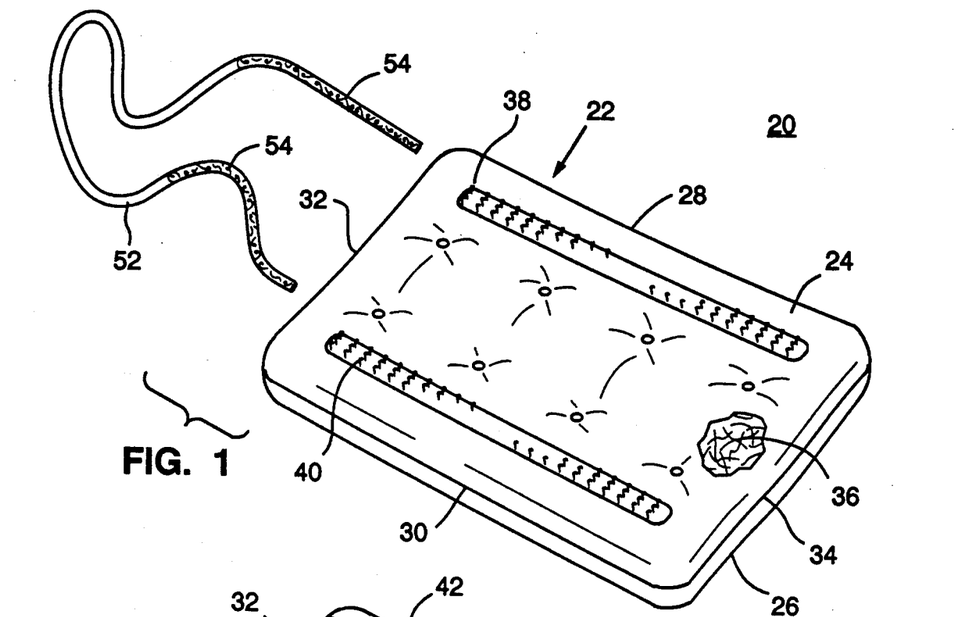
FIG. 1 is a top-perspective view of one embodiment of a roll-up body support cushion in accordance with the present invention.

Referring to FIG. 1, there is illustrated one embodiment 20 of a roll-up body support cushion in accordance with the present invention. The roll-up body support cushion 20 includes a substantially rectangular cushion 22 which has a first surface 24 opposed to a second surface 26. The cushion 22 has two long sides 28 and 30 and two short sides 32 and 34. Preferably, the long sides 28 and 30 may each be approximately twenty-four inches long, and the short sides 32 and 34 may each be approximately fifteen inches long. However, the exact length of the sides 28, 30, 32, and 34 may vary.

Pillow fill 36 is enclosed inside the cushion 22 between the first and second surfaces 24 and 26. Preferably, the cushion should contain enough pillow fill 36 to make it approximately two inches thick. The pillow fill 36, however, should remain loose enough such that the cushion 22 is flexible and can be rolled up.

Although the cushion 22 illustrated in the Figures is rectangular, it should be understood that the cushion 22 may be nearly any shape, such as triangular, circular, hexagonal, pentagonal, etc. Any of these shapes has a length and a width, and the only requirement is that the cushion be capable of being rolled-up in a direction substantially parallel to its length. Furthermore, the cushion 22 may be constructed from a wide variety of different types of materials. Two types of materials that have been found to work well are a silver coated tricot fabric and a corduroy type material; however, it should be well understood that the material used to construct the cushion 22 is not limited to these two types of materials.

Two strips of hook fastening material 38 and 40 are secured to the first surface 24 of the cushion 22. The two strips 38 and 40 are positioned substantially parallel to the long sides 28 and 30 of the cushion 22. Preferably, the two strips 38 and 40 have lengths equal to at least two-thirds the length of the long sides 28 and 30 of the cushion 22. However, the two strips 38 and 40 are preferably short enough such that there is at least a one inch space between the ends of strips 38 and 40 and the short sides 32 and 34 of the cushion 22.

Figure 2:
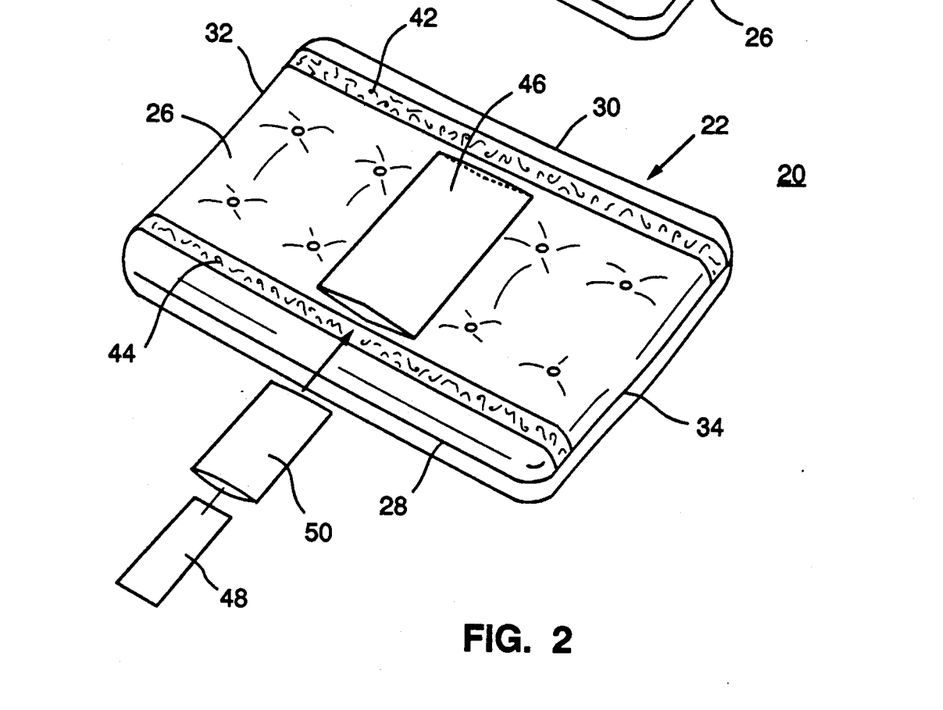
FIG. 2 is a bottom-perspective view of the roll-up body support cushion of FIG. 1.

Referring to FIG. 2, there is illustrated the second surface 26 of the cushion 22. Two strips of loop fastening material 42 and 44 are secured to the second surface 26. The two strips 42 and 44 are positioned substantially parallel to the long sides 28 and 30 of the cushion 22. Furthermore, the strips 42 and 44 are each juxtaposed to the respective strips of hook fastening material 40 and 38 secured to the first surface 24. For this particular embodiment 20, best results are obtained when the two strips 42 and 44 have lengths equal to at least two-thirds the length of the long sides 28 and 30 of the cushion 22. Preferably, the strips 42 and 44 should extend completely to the short sides 32 and 34 of the cushion 22, as illustrated in FIG. 2.

The two strips of hook fastening material 38 and 40 and the two strips of loop fastening material 42 and 44 are preferably the type of hook and loop fastening material, respectively, that is marketed under the trademark VELCRO. Although VELCRO fastening material is preferred, it is believed that other types of fastening material can be used for the strips 38, 40, 42, and 44. These other types of fastening material should preferably be complementary releasable fastening materials similar to hook and loop fastening material. For example, rows of snaps and buttons may be used for the strips 38, 40, 42, and 44. A row of snaps may be secured to the first surface 24, and a row of complementary buttons may be secured to the second surface 26. It is believed that adhesive tape may also be used for the strips 38, 40, 42, and 44 in accordance with the present invention.

While FIGS. 1 and 2 illustrate two parallel strips of hook 38 and 40 and loop 42 and 44 fastening material, it is believed that a single strip of fastening material may be used on the cushion 22 in accordance with the present invention. It is envisioned that such a single strip of fastening material may be wider than the strips 38, 40, 42, and 44 in order to give the desired results.

A pocket 46 may be secured to the second surface 26 of the cushion 22. The pocket 46, which is optional, is for receiving a hot or cold pack 48. It is generally understood that a hot pack will soothe sore, tense muscles, and that a cold pack will help relive pain and inflammation. It is recommended that a terrycloth protector 50 be placed around the hot/cold pack 48 before it is inserted into the pocket 46.

Referring back to FIG. 1, a strap 52 may be used to position or hang the cushion 22. The strap 52 preferably has loop fastening material 54, such as VELCRO, secured to at least a portion of the strap for attaching to the two strips of hook fastening material 38 and 40 on the first surface 24 of the cushion 22. The entire strap 52 may be made of loop fastening material.

Figure 3:
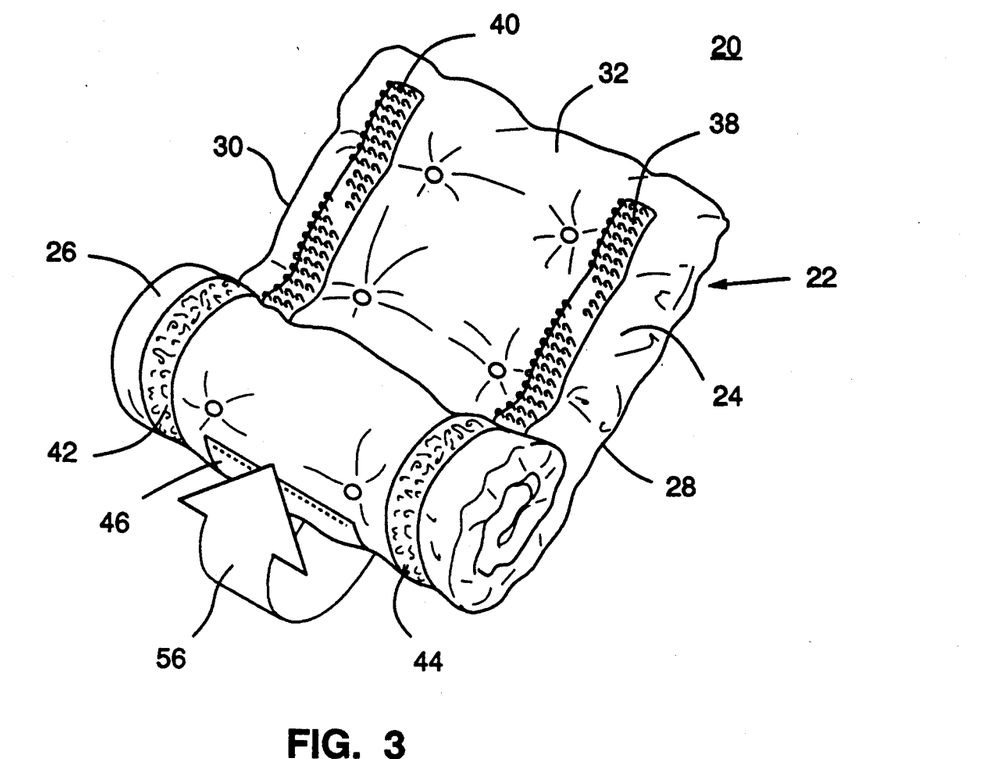
FIG. 3 is a perspective view illustrating the manner in which the roll-up body support cushion of FIG. 1 may be rolled up.

Referring the FIG. 3, the cushion 22 is generally rolled-up in a direction substantially parallel to its long sides 28 and 30 as illustrated by arrow 56. Preferably, the first surface 24 should be facing up before the cushion 22 is rolled. If the first surface 24 is facing up, the two strips of hook fastening material 38 and 40 will be rolled inside the cushion 22. By rolling the hook fastening strips 38 and 40 on the inside of the roll, the softer strips of loop fastening material 42 and 44 are exposed on the outside of the roll. The softer loop strips 42 and 44 will not snag on the user's clothing.

As the cushion 22 is rolled, the two strips of loop fastening material 42 and 44 make contact with the two strips of hook fastening material 40 and 38, respectively. As is generally known, when hook and loop fastening material is pressed together, the two materials become securely attached. Hook and loop fastening material can be released from one another by pulling them directly apart. Thus, when the strips of loop fastening material 42 and 44 make contact with the strips of hook fastening material 40 and 38, the cushion 22 is secured in a rolled up position. The cushion 22 may be un-rolled by firmly un-rolling it such that the hook and loop fastening strips 38, 40, 42, and 44 are pulled apart.

Figure 4:
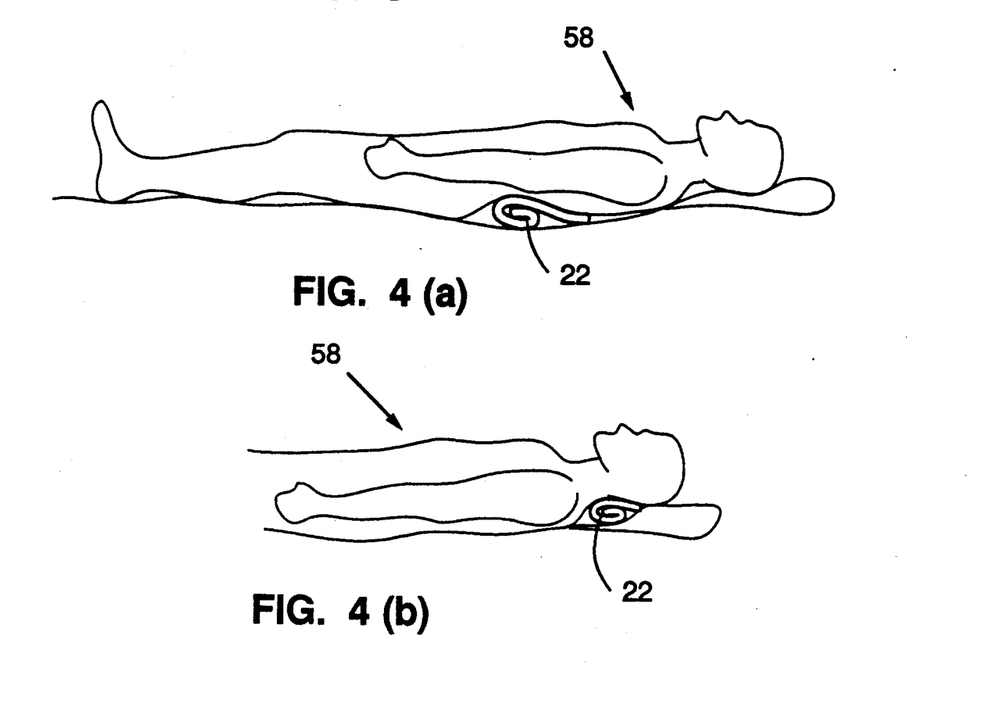
FIG. 4(a) illustrates the roll-up body support cushion of FIG. 1 being used on the lumbar portion of the back.
FIG. 4(b) illustrates the roll-up body support cushion of FIG. 1 being used on the neck.

Referring to FIG. 4(a), the rolled-up cushion 22 may be placed under the lumbar portion of a person's 58 back. FIG. 4(b) illustrates that the rolled-up cushion 22 may also be placed under a person's 58 neck. The cushion 22 may be rolled up into many different shapes, sizes, thicknesses, and firmnesses. The more it is rolled, the larger it gets; the tighter it is rolled, the firmer it gets. Thus, it can be used by nearly any person of any shape or size. Furthermore, the cushion 22 may be rolled in a manner that accommodates the person's specific needs at the time. For example, the cushion 22 may be rolled tighter to provide firmer support, or it can be rolled looser to provide a softer support. Additionally, a hot/cold pack may be inserted in the pocket 46 for an added therapeutic effect.

Figure 5:
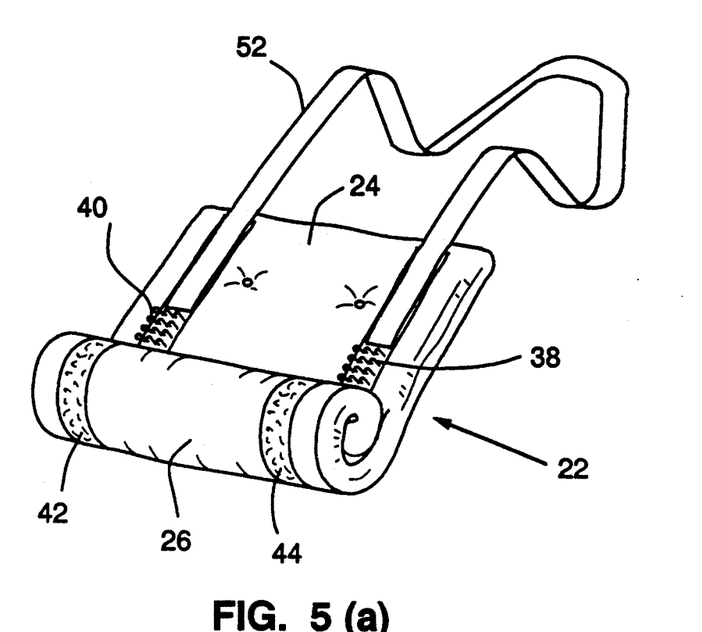
FIGS. 5(a) and 5(b) illustrate two alternative methods of using a strap with the roll-up body support cushion of FIG. 1.

Referring to FIG. 5(a), there is illustrated the rolled-up cushion 22 with the optional strap 52 attached. The strap 52 has loop fastening material secured to it such that it fastens to the two hook fastening strips 38 and 40. The length of the strap 52 may be adjusted by attaching more or less of the strap 52 to the hook fastening strips 38 and 40. As shown in FIG. 5(b), the strap 52 may be tied in a knot 54 in order to further adjust the length of the strap 52.

FIG. 6(a) illustrates the manner in which the rolled-up cushion 22 may be positioned on a conventional automobile seat 56. The strap 52 is placed around the head rest 58. The cushion 22 hangs from the head rest by the strap 52. Preferably, the soft loop fastening strips 42 and 44 face away from the seat 56, and thus, come into contact with the user's clothing. The soft loop strips will not snag the user's clothing. The rough hook fastening strips 38 and 40 face and contact the seat 56 which helps hold the cushion 22 in place.

FIG. 6(b) is a cross-sectional view of the seat 56 of FIG. 6(a) with a person seated in it. The Figure illustrates the support that the rolled-up cushion 22 gives to the lumbar portion of the person's 60 back.

Figures 6, 7:
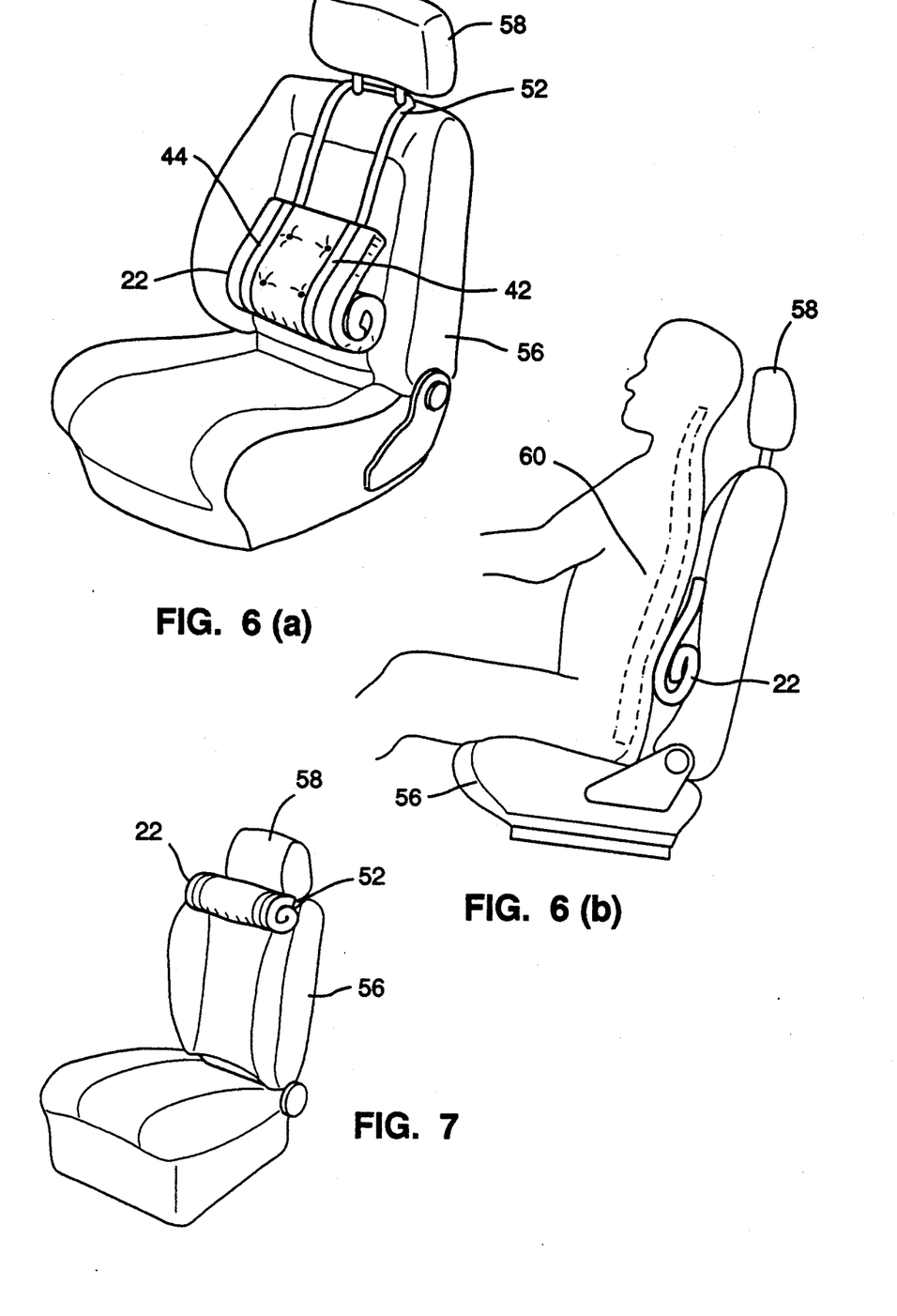
FIG. 7 illustrates an alternative method of using the strap to position the roll-up body support cushion of FIG. 1 on an automobile seat.

The positioning of the cushion 22 on an automobile seat is adjusted by adjusting the length of the strap 52 in the manner discussed above. As illustrated in FIG. 7, the strap 52 may be adjusted such that the rolled-up cushion 22 is held up against the head rest 58 of the seat 56. This position will provide support to a person's neck.

Figures 8, 9:
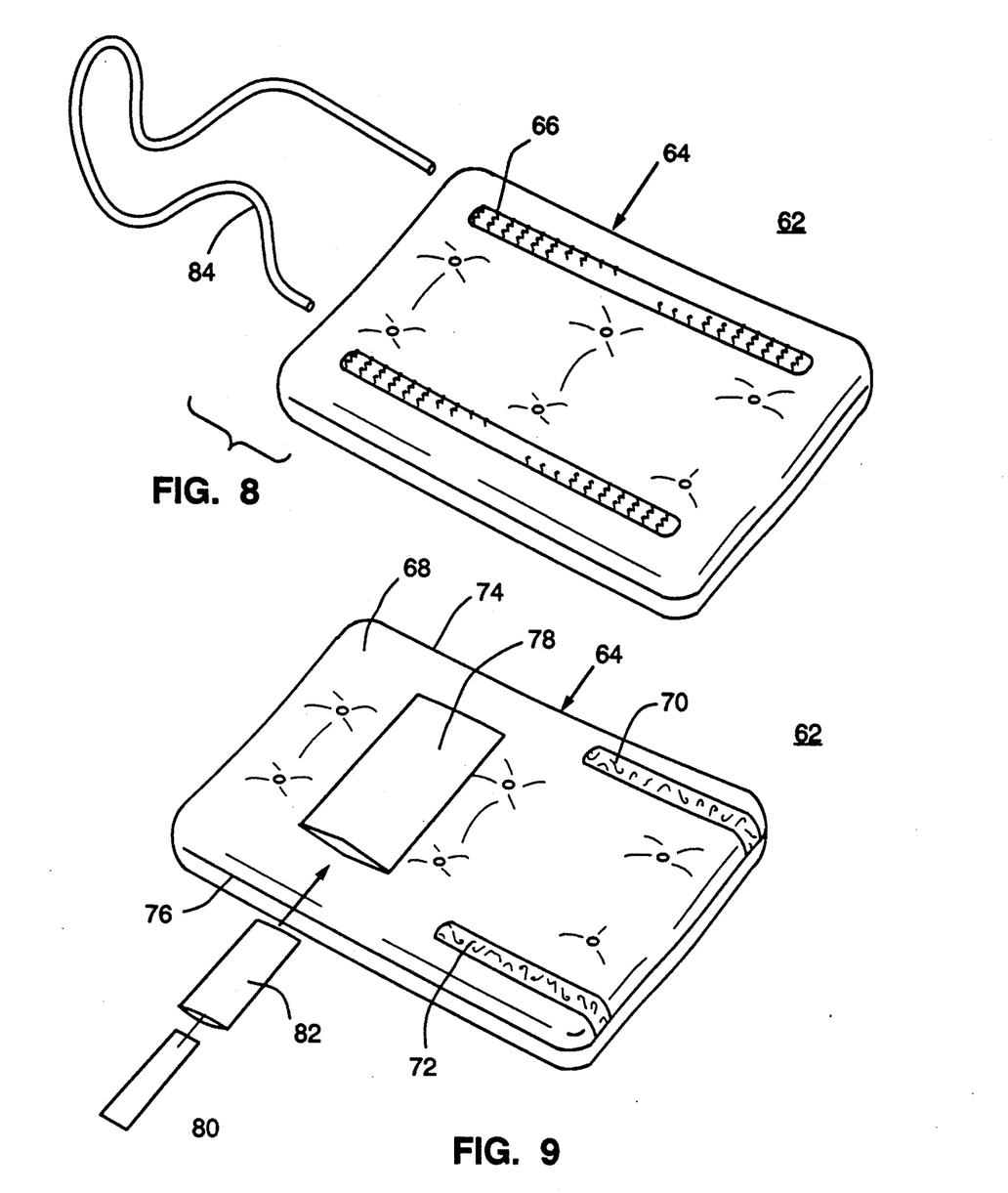
FIG. 8 is a top-perspective view of an alternative embodiment of a roll-up body support cushion in accordance with the present invention.
FIG. 9 is a bottom-perspective view of the alternative roll-up body support cushion of FIG. 8.

Referring to FIGS. 8 and 9, there is illustrated an alternative embodiment 62 of a roll-up body support cushion in accordance with the present invention. The cushion 64 is substantially identical to the cushion 22 of FIGS. 1 and 2, except for one primary difference. The primary difference is the length of the strips of loop fastening material 70 and 72. The strips 70 and 72 have lengths falling in the range of one-fourth to one-half the length of the long sides 74 and 76 of the cushion 64. The other features of the alternative embodiment 62 of the roll-up body support cushion are the same as shown in FIGS. 1 through 7, such as an optional pocket 78, a hot/cold pack 80, a terrycloth protector 82, and an optional strap 84.

Figure 10:
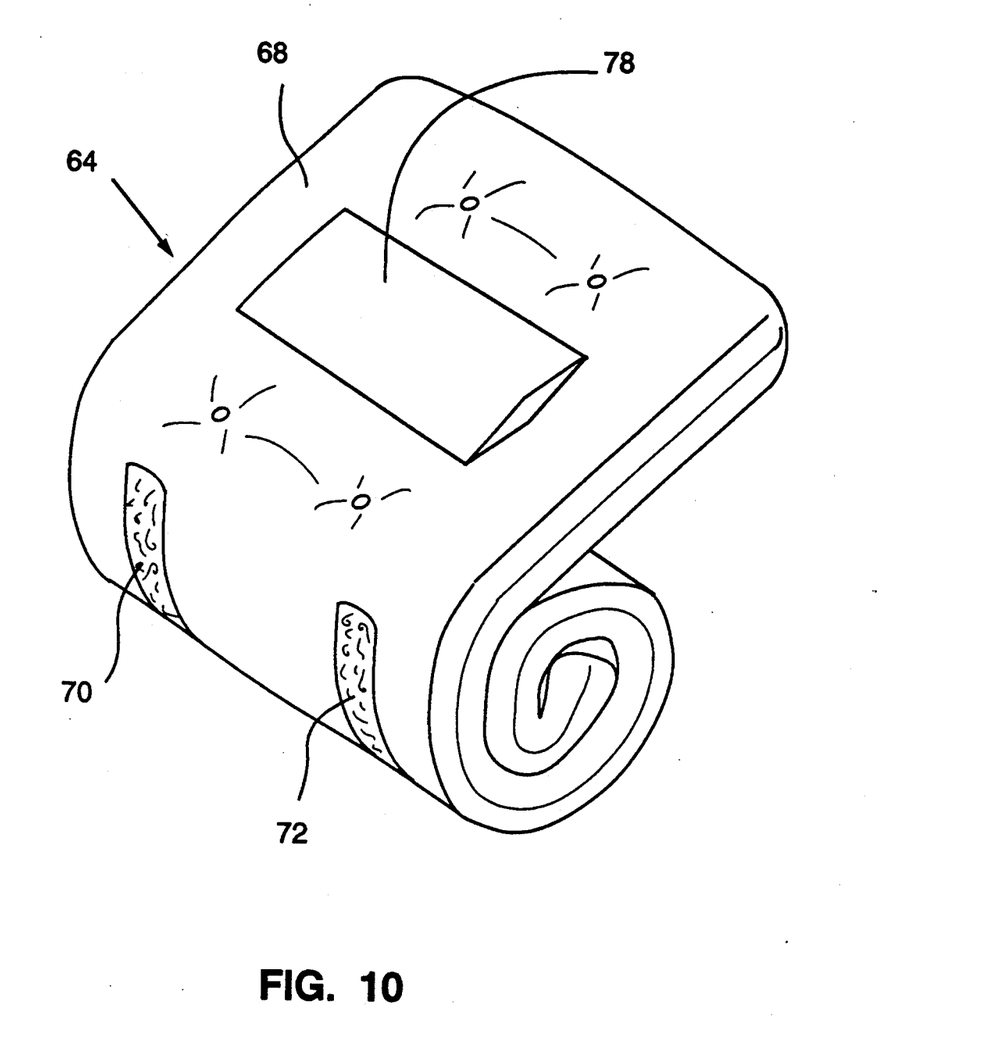
FIG. 10 is a perspective view illustrating the manner in which roll-up body support cushion of FIG. 8 may be rolled up.

FIG. 10 illustrates the advantage of having two shorter strips of loop fastening material 70 and 72 on the cushion 64. When the cushion 64 is approximately half-way rolled-up, approximately one-half to three-fourths of the second surface 68 is free of all hook and loop fastening strips. This half of the second surface 68 provides a comfortable surface for resting one's face due to the absence of hook and loop strips Thus, the alternative embodiment 62 of the roll-up body support cushion is ideal for supporting a person's neck because there is a comfortable place to rest the person's head and face.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A roll-up body support cushion, comprising:
   a cushion having first and second opposed surfaces having pillow fill positioned therebetween, the cushion having a length and a width, the cushion being flexible such that it can be rolled up in a direction substantially parallel to its length to give substantial support to various body portions;
   a strip fastening means for releasably fastening to a complementary strip fastening means, the strip fastening means being secured to the first opposed surface, having a length equal to at least one-fourth the length of the cushion, and being positioned substantially parallel to the length of the cushion; and
   a complementary strip fastening means for releasably fastening to the strip fastening means, the complementary strip fastening means being secured to the second opposed surface, having a length equal to at least one-fourth the length of the cushion, and being positioned substantially parallel to the length of the cushion and in juxtaposition to the respective strip fastening means secured to the first opposed surface.

2. The body support cushion of claim 1, wherein:
   the strip fastening means secured to the first opposed surface comprises a strip of hook fastening material having a length equal to at least two-thirds the length of the cushion.

3. The body support cushion of claim 2, wherein:
   the complementary strip fastening means secured to the second opposed surface comprises a strip of loop fastening material having a length equal to at least two-thirds the length of the cushion.

4. The body support cushion of claim 3, further comprising:
   a pocket secured to the second opposed surface for receiving a hot/cold pack.

5. The body support cushion of claim 2, wherein:
   the complementary strip fastening means secured to the second opposed surface comprises a strip of loop fastening material having a length falling in the range of one-fourth to one-half the length of the cushion.

6. The body support cushion of claim 5, further comprising:
   a pocket secured to the second opposed surface for receiving a hot/cold pack.

7. The body support cushion of claim 1, further comprising:
   a pocket secured to the second opposed surface for receiving a hot/cold pack.

8. The body support cushion of claim 1, further comprising:
   a strap having complementary strip fastening means secured thereto for releasably fastening to the strip fastening means secured to the first opposed surface.

9. A roll-up body support cushion, comprising:
   a cushion having first and second opposed surfaces having pillow fill positioned therebetween, the cushion having a length and a width, the cushion being flexible such that it can be rolled up in a direction substantially parallel to its length to give substantial support to various body portions;
   two strips of strip fastening means for releasably fastening to a complementary strip fastening means, the two strips of strip fastening means being secured to the first opposed surface and each having a length equal to at least one-fourth the length of the cushion, the two strips of strip fastening means being positioned substantially parallel to each other; and
   two strips of complementary strip fastening means for releasably fastening to the strip fastening means, the two strips of complementary strip fastening means being secured to the second opposed surface and each having a length equal to at least one-fourth the length of the cushion, the two strips of complementary strip fastening means being positioned substantially parallel to each other and in juxtaposition to the respective two strips of strip fastening means secured to the first opposed surface.

10. The body support cushion of claim 9, wherein:
    the cushion comprises a substantially rectangular cushion having a pair of long sides and a pair of short sides, the long sides being parallel to and equal to the length of the cushion and the short sides being parallel to and equal to the width of the cushion.

11. The body support cushion of claim 9, wherein:
    the two strips of strip fastening means secured to the first opposed surface each have a length equal to at least two-thirds the length of the cushion and are positioned substantially parallel to the length of the cushion.

12. The body support cushion of claim 11, wherein:
    the two strips of complementary strip fastening means secured to the second opposed surface each have a length equal to at least two-thirds the length of the cushion and are positioned substantially parallel to the length of the cushion.

13. The body support cushion of claim 12, wherein:
    the two strips of strip fastening means each comprise a strip of hook fastening material; and the two strips of complementary strip fastening means each comprise a strip of loop fastening material.

14. The body support cushion of claim 12, further comprising:
a pocket secured to the second opposed surface for receiving a hot/cold pack.

15. The body support cushion of claim 11, wherein:
the two strips of complementary strip fastening means secured to the second opposed surface each have a length falling in the range of one-fourth to one-half the length of the cushion and are positioned substantially parallel to the length of the cushion.

16. The body support cushion of claim 15, wherein:
the two strips of strip fastening means each comprise a strip of hook fastening material; and
the two strips of complementary strip fastening means each comprise a strip of loop fastening material.

17. The body support cushion of claim 15, further comprising:
a pocket secured to the second opposed surface for receiving a hot/cold pack.

18. The body support cushion of claim 9, further comprising:
a pocket secured to the second opposed surface for receiving a hot/cold pack.

19. The body support cushion of claim 9, further comprising:
a strap having complementary releasable fastening material secured thereto for attaching to the strips of releasable fastening material secured to the first opposed surface.

20. A roll-up body support cushion, comprising:
a substantially rectangular cushion having first and second opposed surfaces having pillow fill positioned therebetween, the cushion having a pair of long sides and a pair of short sides, the cushion being flexible such that it can be rolled up in a direction substantially parallel to its long sides to give substantial support to various body portions;
two strips of hook fastening material secured to the first opposed surface, the two strips of hook fastening material being positioned substantially parallel to the long sides of the cushion, the two strips of hook fastening material having lengths equal to at least two-thirds the length of the long sides of the cushion; and
two strips of loop fastening material secured to the second opposed surface and each having a length equal to at least one-fourth the length of the long sides of the cushion, the two strips of loop fastening material being positioned substantially parallel to the long sides of the cushion and in juxtaposition to the respective strips of hook fastening material secured to the first opposed surface.

21. The body support cushion of claim 20, wherein:
the two strips of loop fastening material have lengths equal to at least two-thirds the length of the long sides of the cushion.

22. The body support cushion of claim 21, further comprising:
a pocket secured to the second opposed surface for receiving a hot/cold pack.

23. The body support cushion of claim 20, wherein:
the two strips of loop fastening material have lengths falling in the range of one-fourth to one-half the length of the long sides of the cushion.

24. The body support cushion of claim 23, further comprising:
a pocket secured to the second opposed surface for receiving a hot/cold pack.

25. The body support cushion of claim 20, further comprising:
a pocket secured to the second opposed surface for receiving a hot/cold pack.

26. The body support cushion of claim 20, further comprising:
a strap having loop fastening material secured thereto for attaching to the two strips of hook fastening material.

27. A roll-up body support cushion, comprising:
a cushion having first and second opposed surfaces and having a quantity of pillow fill positioned therebetween such that portions of the cushion are at least approximately two inches thick when the pillow fill is uncompressed, the cushion having a length and a width, the cushion being flexible such that it can be rolled up in a direction substantially parallel to its length to give substantial support to various body portions;
a strip fastening means for releasably fastening to a complementary strip fastening means, the strip fastening means being secured to the first opposed surface, having a length equal to at least one-fourth the length of the cushion, and being positioned substantially parallel to the length of the cushion; and
a complementary strip fastening means for releasably fastening to the strip fastening means, the complementary strip fastening means being secured to the second opposed surface, having a length equal to at least one-fourth the length of the cushion, and being positioned substantially parallel to the length of the cushion and in juxtaposition to the respective strip fastening means secured to the first opposed surface.

28. The body support cushion of claim 27, wherein:
the strip fastening means secured to the first opposed surface comprises a strip of hook fastening material having a length equal to at least two-thirds the length of the cushion.

29. The body support cushion of claim 28, wherein:
the complementary strip fastening means secured to the second opposed surface comprises a strip of look fastening material having a length equal to at least two-thirds the length of the cushion.

30. The body support cushion of claim 29, further comprising:
a pocket secured to the second opposed surface for receiving a hot/cold pack.

31. The body support cushion of claim 28, wherein:
the complementary strip fastening means secured to the second opposed surface comprises a strip of loop fastening material having a length falling in the range of one-fourth to one-half the length of the cushion.

32. The body support cushion of claim 31, further comprising:
a pocket secured to the second opposed surface for receiving a hot/cold pack.

33. The body support cushion of claim 27, further comprising:
a pocket secured to the second opposed surface for receiving a hot/cold pack.

34. The body support cushion of claim 27, further comprising:
a strap having complementary strip fastening means secured thereto for releasably fastening to the strip fastening means secured to the first opposed surface.

* * * * *